United States Patent
Aizawa

(10) Patent No.: US 11,062,031 B2
(45) Date of Patent: Jul. 13, 2021

(54) ELECTRONIC DEVICE, CONTROL METHOD, AND COMPUTER-READABLE NONVOLATILE STORAGE MEDIUM

(71) Applicant: Toshiba Client Solutions CO., LTD., Tokyo (JP)

(72) Inventor: Naoyuki Aizawa, Fussa Tokyo (JP)

(73) Assignee: Toshiba Client Solutions CO., LTD., Tokyo (JP)

( * ) Notice: Subject to any disclaimer, the term of this patent is extended or adjusted under 35 U.S.C. 154(b) by 185 days.

(21) Appl. No.: 16/114,930

(22) Filed: Aug. 28, 2018

(65) Prior Publication Data

US 2019/0286824 A1    Sep. 19, 2019

(30) Foreign Application Priority Data

Mar. 16, 2018 (JP) .............................. JP2018-049855

(51) Int. Cl.
*G06F 21/00* (2013.01)
*G06F 21/57* (2013.01)
*G06F 21/44* (2013.01)
*G06F 21/31* (2013.01)
*G06F 21/62* (2013.01)

(52) U.S. Cl.
CPC ............ *G06F 21/575* (2013.01); *G06F 21/31* (2013.01); *G06F 21/44* (2013.01); *G06F 21/6218* (2013.01); *G06F 2221/2111* (2013.01)

(58) Field of Classification Search
CPC ........ G06F 21/575; G06F 21/31; G06F 21/44; G06F 21/6218; G06F 21/572; G06F 21/57; G06F 21/62; G06F 2221/2111; G06F 2221/21
See application file for complete search history.

(56) References Cited

U.S. PATENT DOCUMENTS

| | | | |
|---|---|---|---|
| 9,117,092 B2 * | 8/2015 | Lemieux | H04W 12/1206 |
| 2003/0188199 A1 | 10/2003 | Tadano et al. | |
| 2018/0152570 A1 * | 5/2018 | Koelewijn | H04N 1/00251 |
| 2018/0196495 A1 * | 7/2018 | Wang | G06F 1/3206 |
| 2018/0322269 A1 * | 11/2018 | Arora | G06F 21/36 |
| 2019/0114432 A1 * | 4/2019 | Tang | G06F 21/575 |
| 2019/0171820 A1 * | 6/2019 | Chen | G06F 9/4418 |

FOREIGN PATENT DOCUMENTS

| | | |
|---|---|---|
| JP | 2002-278932 A | 9/2002 |
| JP | 2003-288275 A | 10/2003 |
| WO | WO 2005/111825 A1 | 11/2005 |

* cited by examiner

*Primary Examiner* — Eleni A Shiferaw
*Assistant Examiner* — Stephanie S Ham
(74) *Attorney, Agent, or Firm* — Knobbe, Martens, Olson & Bear, LLP

(57) ABSTRACT

According to one embodiment, an electronic device executes a specified software. The electronic device includes a first storage that stores the specified software, and a firmware that controls a hardware included in the electronic device. The firmware is started after the electronic device is powered on and before the specified software is executed. The firmware invalidates a password authentication when the electronic device is in a particular environment, and validates the password authentication when the electronic device is out of the particular environment.

7 Claims, 7 Drawing Sheets

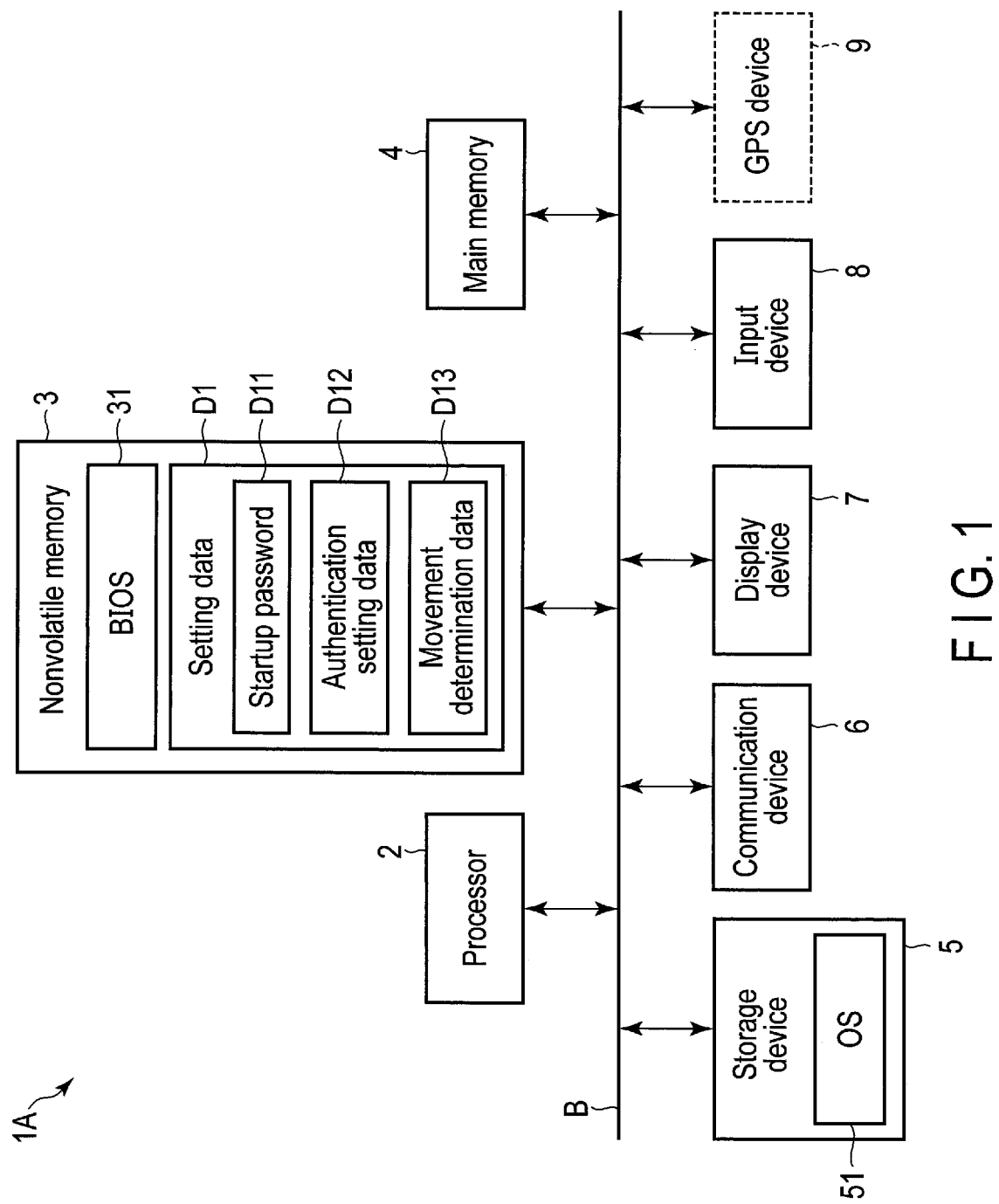
F I G. 1

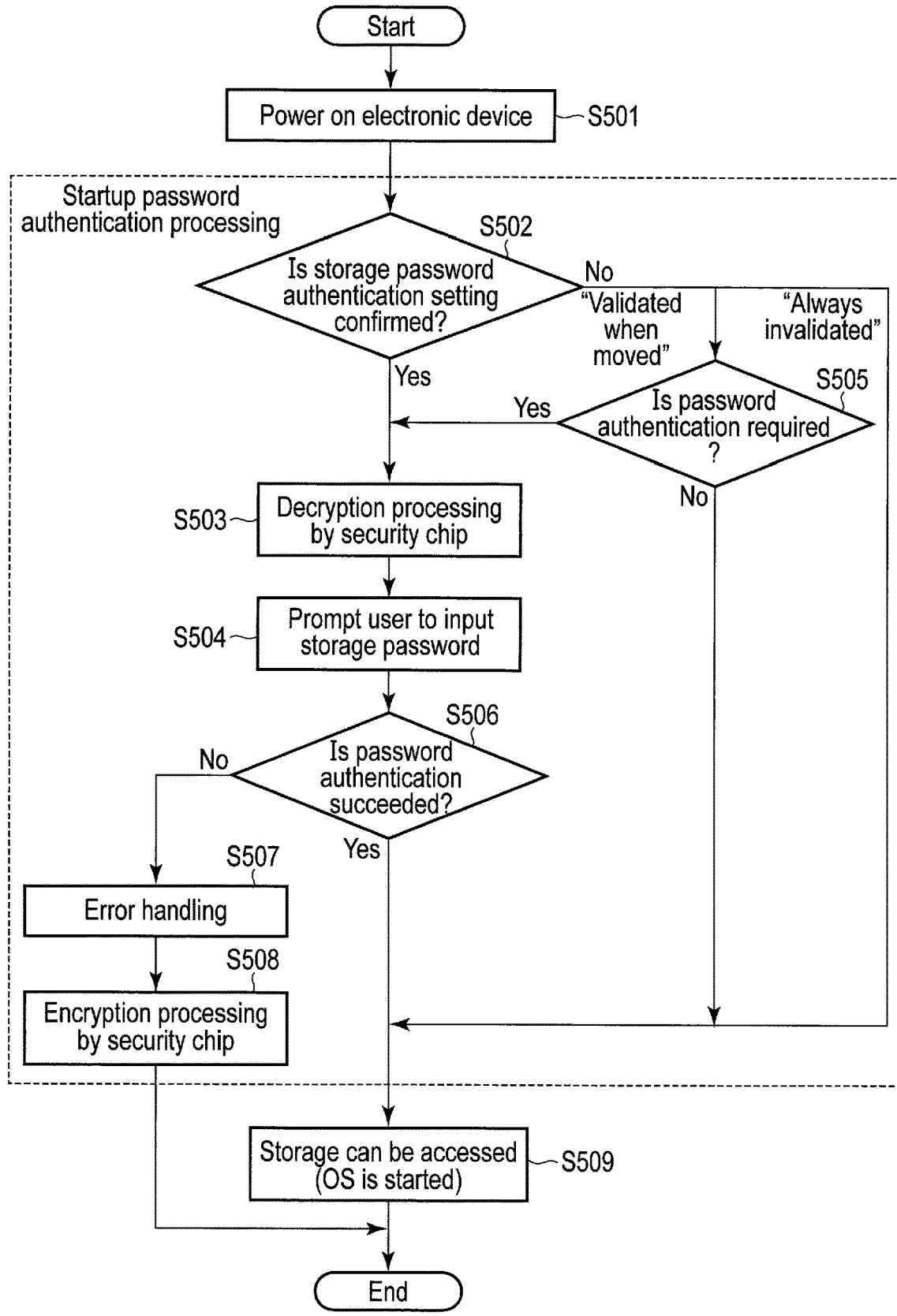
F I G. 7

ELECTRONIC DEVICE, CONTROL METHOD, AND COMPUTER-READABLE NONVOLATILE STORAGE MEDIUM

CROSS-REFERENCE TO RELATED APPLICATIONS

This application is based upon and claims the benefit of priority from Japanese Patent Application No. 2018-049855, filed Mar. 16, 2018, the entire contents of which are incorporated herein by reference.

FIELD

Embodiments described herein relate generally to an electronic device, a control method, and a computer-readable nonvolatile storage medium.

BACKGROUND

Generally, a user of a personal computer (PC) can prevent unauthorized usage of this PC by the other person by setting a startup password as necessary. For example, in a case of a PC which can be carried easily such as a notebook PC, it is recommended that a startup password should be set when the PC is taken outside. In contrast, when the PC is installed in a place not entered by the other person, the startup password is unnecessary.

However, switching validity/invalidity of the startup password authentication is troublesome for the user, and as a result of this switching not being exercised correctly, safety and convenience of the PC when it is used are lowered. For example, when the user forgets to validate the startup password authentication when it is taken out (in other words, the PC is continued to be used without needing the password authentication), security of this PC is lowered. Further, if the user forgets to invalidate the startup password authentication even though he/she works at a place not entered by the other person (in other words, the PC is continued to be used with the need of the password authentication), the password must be input every time the PC is booted up, and the user feels this inconvenient.

The object of the embodiments is to provide an electronic device, a control method, and a computer-readable nonvolatile storage medium for storing program capable of automatically switching validity/invalidity of authentication by a startup password of the electronic device.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing an example of an electronic device according to a first embodiment.

FIG. 7 is a flowchart showing a first example of processing performed until an OS of the electronic device is started according to the second embodiment.

DETAILED DESCRIPTION

Figure 2:
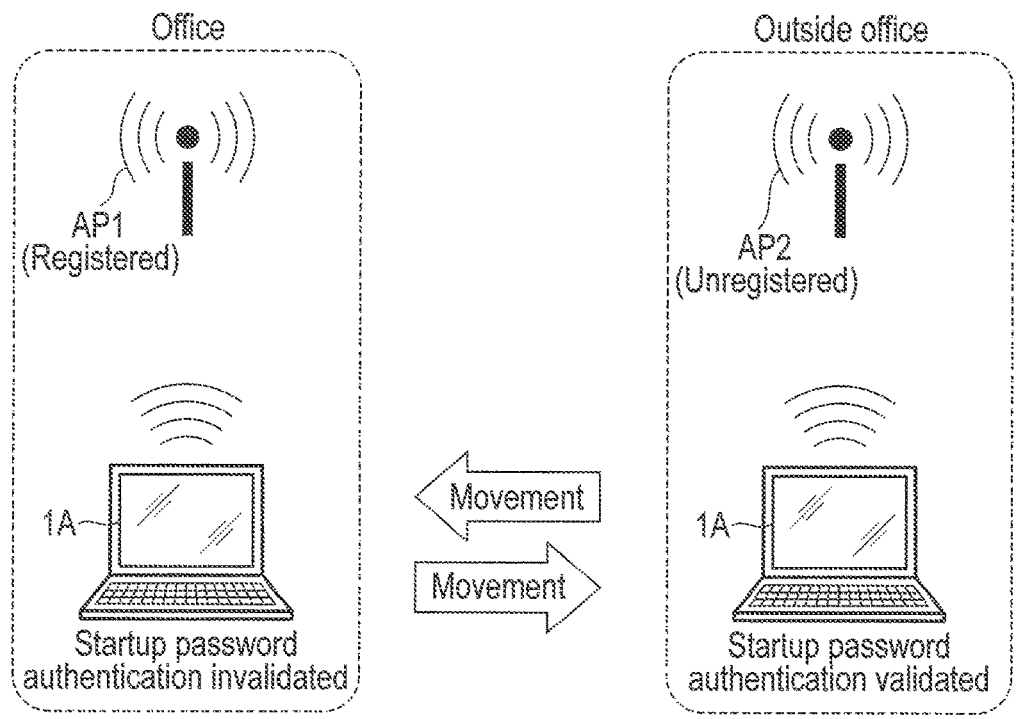
FIG. 2 is a conceptual diagram showing automatic switching operation of password authentication.

Various embodiments will be described hereinafter with reference to the accompanying drawings. Note that the disclosure is merely an example, and the embodiments are not limited by the descriptions provided below. Modifications easily conceivable by a person skilled in the art fall within the scope of the disclosure as a matter of course. In order to make the description clearer, the sizes, shapes, and the like, of the respective parts may be changed and illustrated schematically in the drawings as compared with those in an accurate representation. The same reference numbers may be assigned to corresponding constituent elements in the drawings, and detailed descriptions of them may be omitted.

In general, according to one embodiment, an electronic device executes a specified software. The electronic device includes a first storage that stores the specified software, and a firmware that controls a hardware included in the electronic device. The firmware is started after the electronic device is powered on and before the specified software is executed. The firmware invalidates a password authentication when the electronic device is in a particular environment, and validates the password authentication when the electronic device is out of the particular environment.

First Embodiment

In the present embodiment, a BIOS (Basic Input/Output System) refers to firmware which controls hardware of an electronic device in a stage before an operating system (OS) is started. In the present embodiment described below, an example in which the BIOS is used as the firmware is disclosed. However, an EFI (Extensible Firmware Interface)-BIOS or a UEFI (Unified Extensible Firmware Interface)-BIOS, etc., may be used instead of the above BIOS.

FIG. 1 is a block diagram showing an example of an electronic device 1A of the present embodiment.

The electronic device 1A includes a processor 2, a nonvolatile memory 3, a main memory 4, a storage device 5, a communication device 6, a display device 7, an input device 8 and the like, and these elements are connected by a bus B to be communicable with each other.

The electronic device 1A may be a mobile terminal such as a smartphone, a tablet computer, or a notebook computer, or may be a stationary terminal such as a desktop computer.

Examples of the processor 2 are a central processing unit (CPU), a microprocessor unit (MPU) and a digital signal processor (DSP).

The processor 2 executes various programs loaded from the storage device 5 into the main memory 4, and controls the entire electronic device 1A. These programs include, for example, an OS 51. Further, the processor 2 executes a BIOS 31 stored in the nonvolatile memory 3. The various programs executed by the processor 2 are called "specified software".

The nonvolatile memory 3 is composed of a flash memory, for example, and constitutes a storage area together with the main memory 4.

The nonvolatile memory 3 stores the BIOS 31, setting data D1, and the like. The BIOS 31 may be stored in a nonvolatile device different from the nonvolatile memory 3 such as a ROM (read-only memory).

The setting data D1 is data for storing set values which are selected or input by a user for various setting items of the BIOS 31, and includes, for example, a startup password D11, authentication setting data D12, and movement determination data D13.

The startup password D11 is a password set for a startup of the BIOS 31. For example, when the user boots the electronic device 1A for which authentication by the startup password D11 is validated, since the BIOS 31 is started prior to the OS 51 stored in the storage device 5, the OS 51 is not started unless the startup password is input by the user. Note that the user can set the startup password D11 on a setting screen of the BIOS 31.

The authentication setting data D12 is a flag for determining validity or invalidity of authentication by the startup password D11. The authentication setting data D12 indicates whether the electronic device 1A is in, for example, a mode of always validating the startup password authentication, a mode of always invalidating the startup password authentication, or a mode of validating the startup password authentication only when the electronic device 1A is moved. The expression "when moved" in the above refers to a case where the electronic device 1A is used in a place other than a particular environment that the electronic device 1A is normally used, for example. The user can set the authentication setting data D12 on the setting screen of the BIOS 31.

The movement determination data D13 is data used for determining the movement as described above (in other words, used to identify networks). In the following, the movement determination data D13 will be explained as an IP address of a default gateway to which the electronic device 1A is connected. In other words, the BIOS 31 acquires an IP address of a default gateway of a network to which the electronic device 1A is connected, for example, in an environment in which the electronic device 1A is currently used. Then, the BIOS 31 determines that the electronic device 1A is moved and used when this IP address is different from the IP address stored in the movement determination data D13.

Note that the setting data D1 may be stored in the storage device 5.

The main memory 4 is a volatile memory composed of, for example, random access memory (RAM). The main memory 4 is used as a work area, for example, which temporarily stores data or a program when the processor 2 executes various kinds of software.

The storage device 5 is composed of, for example, a hard disk drive (HDD) or a solid-state drive (SSD). In the storage device 5, various kinds of software including the OS 51 or various kinds of data are stored.

The communication device 6 controls communication with the other devices via a network. The network may be a broad band network including, for example, the Internet, an intranet, and a cellular phone line network, or Bluetooth (registered trademark), NFC (Local Area Network), or short-range wireless communication conforming to the other standards. Further, the communication device 6 can be connected to the network by at least one of wire communication and wireless communication.

The display device 7 is, for example, a display. The display device 7 displays an operation screen (a user interface) of the BIOS 31, the OS 51, and the other various kinds of software executed by the processor 2, and data in a form which can be visually recognized by the user of the electronic device 1A.

The input device 8 accepts input from the user of the electronic device 1A. When the electronic device 1A is a smartphone or a tablet terminal, for example, the input device 8 includes, for example, a screen keyboard or a touch sensor. Also, when the electronic device 1A is a desktop terminal, the input device 8 includes, for example, a keyboard or a mouse, etc.

Moreover, the electronic device 1A may include a GPS device 9. The GPS device 9 acquires position information of the electronic device 1A, and outputs this information to the BIOS 31, the OS 51, and the like, executed by the processor 2.

FIG. 2 is a conceptual diagram showing automatic switching operation of password authentication.

Generally, in most cases, only two types of setting, more specifically, "always validated" and "always invalidated", can be made for the startup password authentication of the BIOS. The user invalidates the startup password authentication when he/she uses the electronic device 1A in a place where security is secured, and validates the startup password authentication only when the electronic device 1A is taken out and relocated (or moved). However, the user must make this setting change manually, and this is inconvenient.

Hence, in the present embodiment, a setting item "validated when moved" indicating that the electronic device 1A automatically switches validity/invalidity of the startup password authentication is provided. When the electronic device 1A is set to this "validated when moved" mode, by identifying the network to which the electronic device 1A is connected at the time of startup, for example, the electronic device 1A determines whether it has been moved. Then, the electronic device 1A automatically switches the setting of validity/invalidity of the startup password authentication. In other words, as shown in FIG. 2, when the electronic device 1A is connected to a registered network (access point AP1), such as the office, the electronic device 1A automatically changes the setting so that the startup password authentication is invalidated (i.e., becomes unnecessary). Also, when the electronic device 1A is connected to an unregistered network (access point AP2), such as an outside office, the electronic device 1A automatically changes the setting so that the startup password authentication is validated (i.e., becomes necessary).

Figure 3:
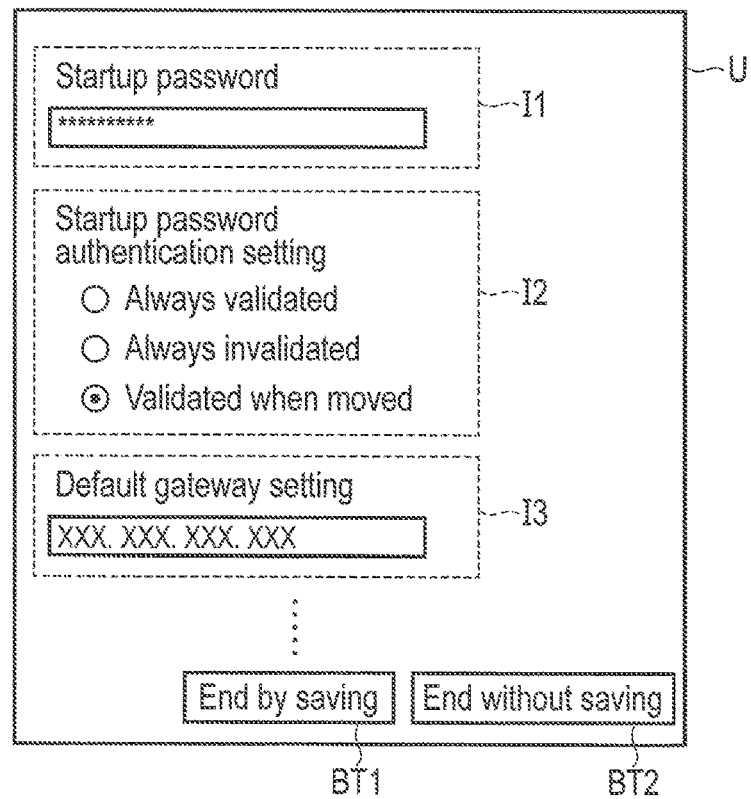
FIG. 3 is an illustration showing an example of a BIOS setting screen according to the first embodiment.

FIG. 3 is an illustration showing an example of a BIOS setting screen U according to the present embodiment.

The BIOS setting screen U is a user interface of the BIOS 31, and is displayed on the display device 7. The BIOS setting screen U includes a field I1 in which a startup password can be input, a field I2 in which authentication setting of the startup password can be selected, and a field I3 in which an IP address of a default gateway can be input, etc. Further, the BIOS setting screen U includes, for example, a button BT1 prompting the user to end the BIOS setting by saving the setting items, and a button BT2 prompting the user to end the BIOS setting without saving the setting items. The user of the electronic device 1A inputs data into or deletes data from the fields I1 to I3 via the input device 8, and selects the button BT1 or BT2.

As the button BT1 is pressed, data in the field I1 is stored as the startup password D11, data in the field I2 is stored as the authentication setting data D12, and data in the field I3 is stored in the nonvolatile memory 4 as the movement determination data D13, respectively.

In the field I2, it is assumed that a mode can be selected from three types of setting, which are "always validated", "always invalidated", and "validated when moved", as described above.

Figure 4:
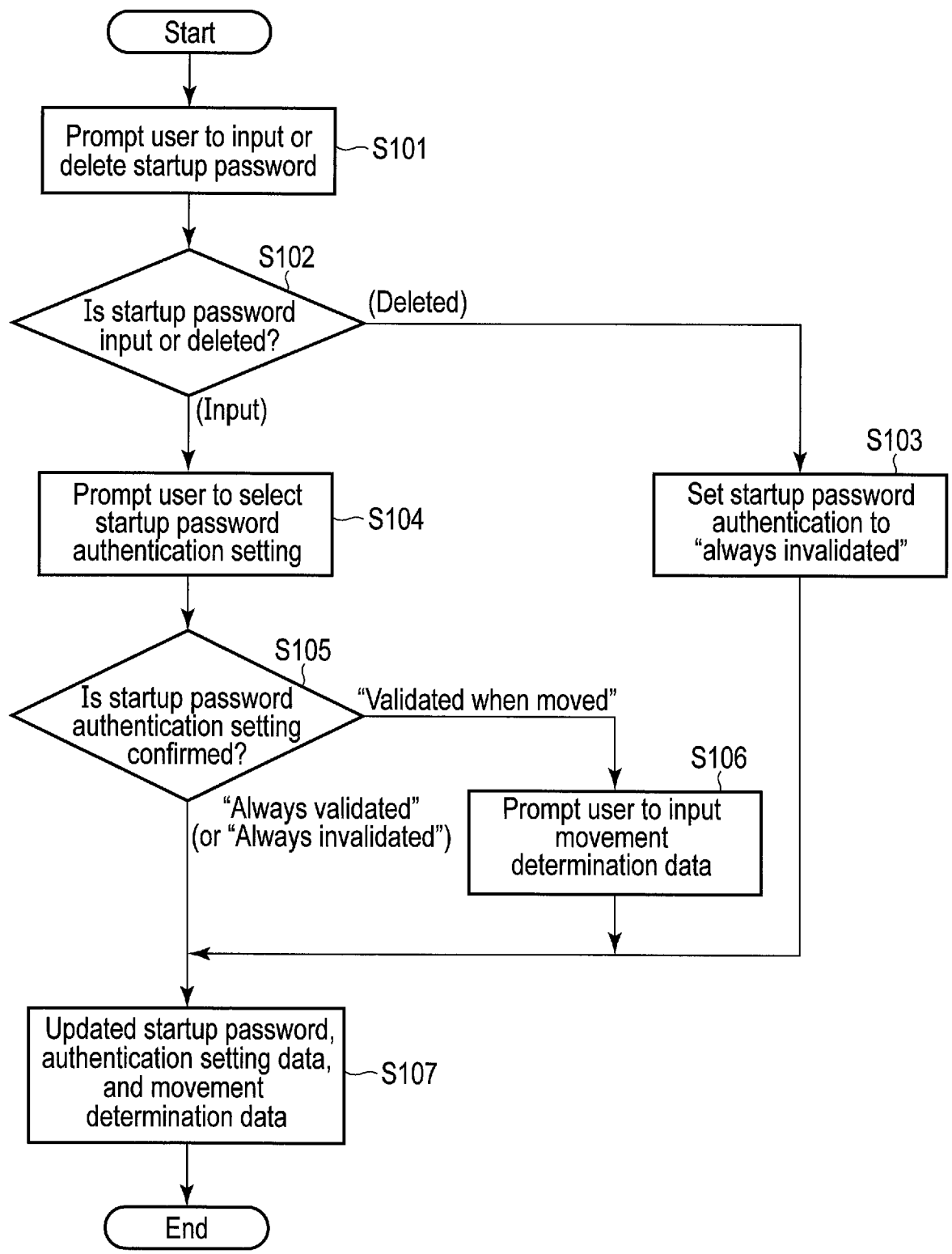
FIG. 4 is a flowchart showing an example of startup password setting processing according to the first embodiment.

FIG. 4 is a flowchart showing an example of a startup password setting processing according to the present embodiment. The startup password setting processing is performed based on an input from the user via the BIOS setting screen U.

In step S101, the BIOS 31 prompts the user to input or delete the startup password. The user inputs or deletes the data of the field I1 of the BIOS setting screen U.

In step S102, the BIOS 31 determines whether the startup password has been input or deleted by the user. More specifically, the BIOS 31 determines whether a startup password has been set in the field I1 of the BIOS setting screen U, or whether the startup password has been deleted from the field I1.

If the startup password is deleted, the BIOS 31 automatically changes the field I2 of the BIOS setting screen U such that the mode "always invalidated" is selected in step S103. After that, the processing proceeds to step S107.

Meanwhile, if the startup password has been set (input), the BIOS 31 prompts the user to select the startup password authentication setting in step S104. The user selects the mode in the field I2 of the BIOS setting screen U. Note that even if a password is set in step S101, "always invalidated" mode may be selected.

In step S105, the BIOS 31 confirms the startup password authentication setting selected in step S104.

When "always validated" is selected in field I2, the processing proceeds to step S107. When "always invalidated" is selected in field I2, the BIOS 31 deletes the startup password input in the field I1, and the processing proceeds to step S107.

When "validated when moved" is selected in the field I2, the BIOS 31 prompts the user to input the movement determination data in step S106. In the example shown in FIG. 3, the movement determination data is an IP address of the default gateway. The user inputs the IP address via the field I3 of the BIOS setting screen U.

In step S107, when the user pushes the button BT1, for example, the BIOS 31 stores the input item of the BIOS setting screen U in the nonvolatile memory. More specifically, the BIOS 31 updates the startup password D11, the authentication setting data D12, and the movement determination data D13 in the nonvolatile memory, based on the input or deleted data of the fields I1 and I3, and the mode selected in the field I2 in steps S101 to S106.

Note that an update processing of step S107 may be carried out not only at the timing of pushing the button BT1, but also in response to the user operation sequentially. For example, the update processing may be executed every time an operation such as input, deletion, or selection, is made through the BIOS setting screen U.

Also, when the user made the setting of the movement determination data D13 (for example, the field I3 of FIG. 3) first, the BIOS 31 may automatically change the mode in the startup password authentication setting to "validated when moved".

Figure 5:
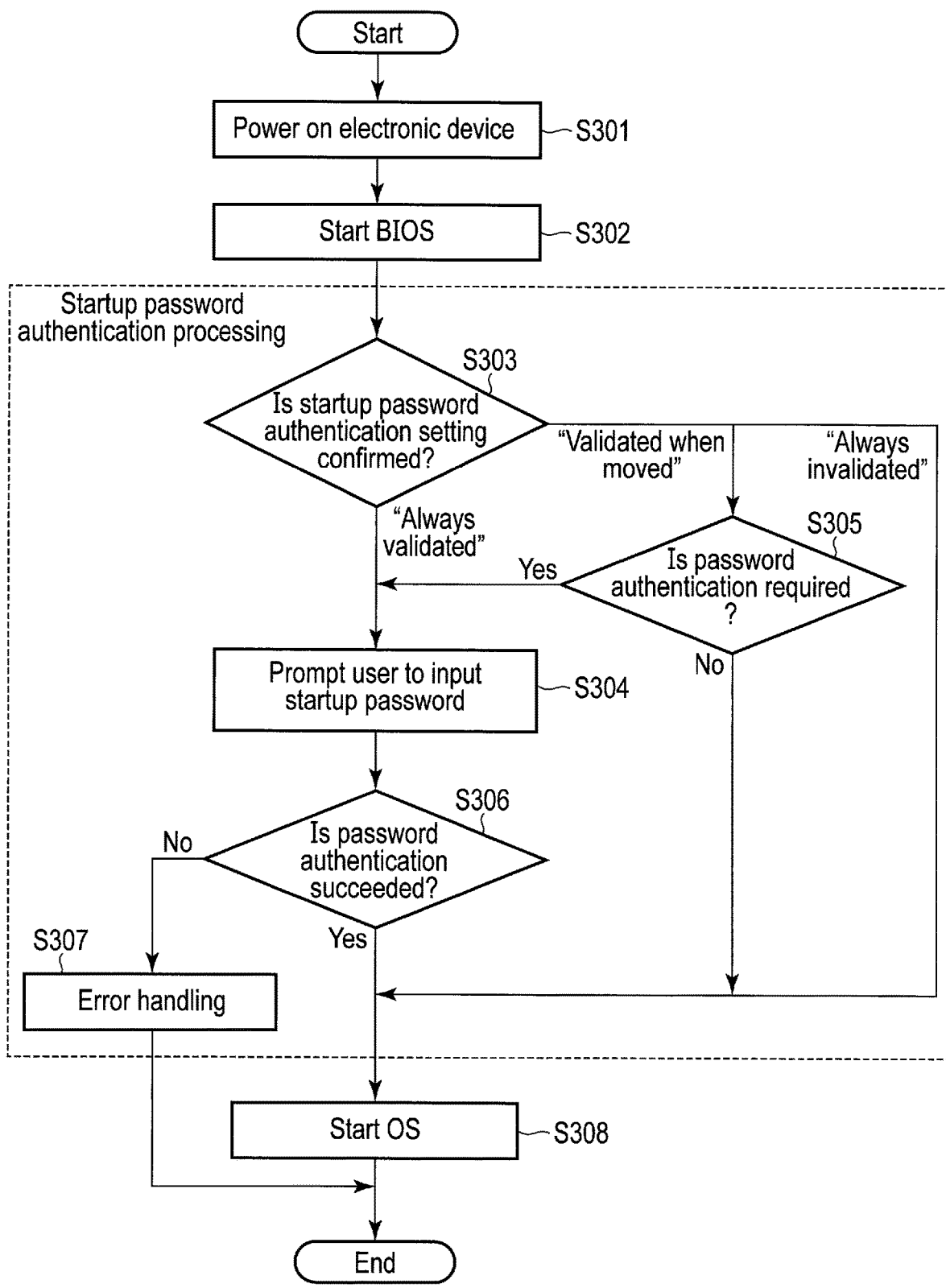
FIG. 5 is a flowchart showing an example of processing performed until an OS of the electronic device is started according to the first embodiment.

FIG. 5 is a flowchart showing an example of a processing performed until the OS of the electronic device 1A is started according to the present embodiment.

In step S301, the electronic device 1A is powered on. Note that the electronic device 1A may be booted from a state in which the hardware is initialized (in other words, may be cold booted), or may be restored from a pause mode (hibernation) or a sleep mode.

In step S302, the BIOS 31 is started. Steps S303 to S308 described below represent a startup password authentication process.

In step S303, the BIOS 31 reads the authentication setting data D12 from the nonvolatile memory 3, and confirms the startup password authentication setting. If the startup password authentication is set to "always validated", the BIOS 31 prompts the user to input the startup password in step S304.

If the startup password authentication is set to "validated when moved", the BIOS 31 determines whether the password authentication is necessary in step S305. More specifically, the BIOS 31 first tries network connection through the communication device 6. If the network connection is successful, the BIOS 31 acquires the IP address of a default gateway.

Alternatively, the BIOS 31 may transmit an arbitrary command such as a ping command and an ARP command to a connected network, and identify the IP address of a default gateway of this network by analyzing a response to the command.

Next, the BIOS 31 reads the movement determination data D13 from the nonvolatile memory 3, and compares the IP address of the default gateway included in the movement determination data D13 with the IP address acquired from the connected network. As a result of a comparison between two IP addresses, if the two IP addresses do not match, the BIOS determines that the electronic device 1A has been moved to a place other than the particular environment (in other words, password authentication is necessary). The processing proceeds to step S304, and the BIOS 31 prompts the user to input the startup password.

If the startup password authentication is set to "always invalidated" in step S303, or if the above result of comparison indicates a match (the two IP addresses match) and it is determined that the electronic device 1A is in the particular environment (that is, password authentication is not necessary) in step S305, the user is not required to input the startup password. Accordingly, the processing proceeds to step S308, and the OS is started.

Note that if the BIOS 31 cannot be connected to the network, the IP address of the default gateway cannot be acquired, so the above comparison result is determined as indicating a mismatch (the two IP addresses do not match). Accordingly, also in this case, an input of the startup password in step S304 is necessary.

In step S306, the BIOS 31 performs the password authentication using the startup password. More specifically, the BIOS 31 reads the startup password D11 from the nonvolatile memory 3, and compares the startup password input by the user with the startup password D11 in step S304. If the comparison result indicates a match (two startup passwords match), password authentication succeeds, so that the processing proceeds to step S308 and the OS is started.

Meanwhile, if the comparison result indicates a mismatch (two startup passwords do not match), the authentication fails. In this case, after performing error handling etc., in step S307, the BIOS 31 ends the startup password authentication processing.

According to the present embodiment described above, in addition to the "always validated" and "always invalidated" modes of the startup password authentication by the BIOS 31, the "validated when moved" mode, which is the mode in which the above two modes are to be automatically switched, is added to the BIOS 31, which operates on the electronic device 1A. As the setting item corresponding to automatic switching is newly added to the existing setting items of the BIOS, the user can select a setting item from the existing setting indicating that the startup password is to be always validated, the existing setting indicating that the startup password is to be always invalidated, and the setting indicating that the startup password is to be validated when moved. In other words, since the user can adopt a mode as appropriate from the three types of setting items according to the usage environment, the convenience of the user is enhanced.

Also, when automatic switching is set for the startup password authentication, the BIOS 31 determines whether the electronic device 1A is connected to a predetermined network when the electronic device 1A is booted. When the electronic device 1A is connected to the predetermined network, the startup password authentication is automatically set to be invalidated. When the electronic device 1A is not connected to the predetermined network, the startup password authentication is automatically set to be validated. In this way, since the user is saved the trouble of manually switching the startup password setting, the convenience of the user is enhanced. More specifically, in a case where the startup password authentication is usually set to be validated, in a particular environment, the inconvenience of performing the startup password authentication every time the electronic device 1A is booted can be eliminated. Also, in a case where the startup password authentication is usually set to be invalidated, the security of the electronic device 1A can be enhanced because the startup password authentication is set to be validated automatically when the user leaves the office or the home, for example.

In the present embodiment, the automatic switching function of the startup password authentication is realized by incorporating this function into the existing BIOS. By this feature, automatic switching of the validity/invalidity of the startup password authentication is enabled not only at the time of cold booting the electronic device 1A, but also at the time of restoration from the pause mode (hibernation) or the sleep mode. Also, by incorporating the above function into the existing BIOS, since the other password authentication program is not required, startup password authentication is not redundant, for example, and the convenience of the user is improved.

Further, in a case where a USB flash drive (USB memory) can be inserted into the electronic device 1A, for example, the BIOS 31 is also started when the OS, etc., from the USB flash drive is started (USB boot). Accordingly, since the startup password authentication can also be validated for such a USB boot, the security of the electronic device 1A can be enhanced.

In the present embodiment, while the movement determination data D13 has been described as an IP address of a default gateway, for example, the other address or data may be applied. For example, as the movement determination data D13, various addresses or data that the electronic device 1A can acquire by connecting to a network, such as an SSID of an access point, an IP address (or a MAC address), and an IP address (or a MAC address) of a network printer on the network to which the electronic device 1A is connected, may be used.

In the present embodiment, when the electronic device 1A comprises the GPS device 9, whether the electronic device 1A has been moved to a place other than the particular environment may be determined, on the basis of the current position information of the electronic device 1A obtained from the GPS device 9. More specifically, for example, the BIOS 31 stores position information indicating a particular range as the movement determination data D13 in the nonvolatile memory 3. The BIOS 31 may determine whether or not the electronic device 1A has been moved to a place other than the particular environment (in other words, whether or not the password authentication is necessary) by acquiring the current position information of the electronic device 1A from the GPS device 9 when the electronic device 1A is booted, and comparing the acquired current position information with the position information included in the movement determination data D13.

In the present embodiment, although processing of prompting the user to input the movement determination data D13 (step S106) has been described, the BIOS 31 may acquire the movement determination data D13 when connected to the network. For example, the BIOS 31 may automatically acquire the IP address of a default gateway at the time of network connection, and the user may be prompted to confirm whether this IP address should be input to the field I3 on the BIOS setting screen U. Also, when the movement determination data D13 is the position information of the electronic device 1A, the BIOS 31 may display the position information acquired from the GPS device 9 to the user on the BIOS setting screen U, and the user may be prompted to confirm whether this position information should be input to the field I3, for example. Further, when the user has confirmed the above, the movement determination data D13 is input to the field I3. As a result, since the user is saved the trouble of searching the movement determination data D13 and inputting the same, the user convenience can be improved.

Second Embodiment

In the first embodiment, the structure and the processing details of the electronic device 1A in automatically switching the startup password authentication of the BIOS 31 have been explained. The automatic switching of the password authentication is applicable also in a case where the storage device 5 performs the password authentication, for example.

In the present embodiment, the structure and the processing details of the electronic device 1A when the automatic switching setting of the password authentication, which is performed by the storage device 5 (hereinafter referred to as storage password authentication), is added to the BIOS 31 will be explained. The storage password authentication is executed by a storage when the storage is accessed.

Note that in the present embodiment, the structure and processing details which duplicate those of the first embodiment will not be explained.

Figure 6:
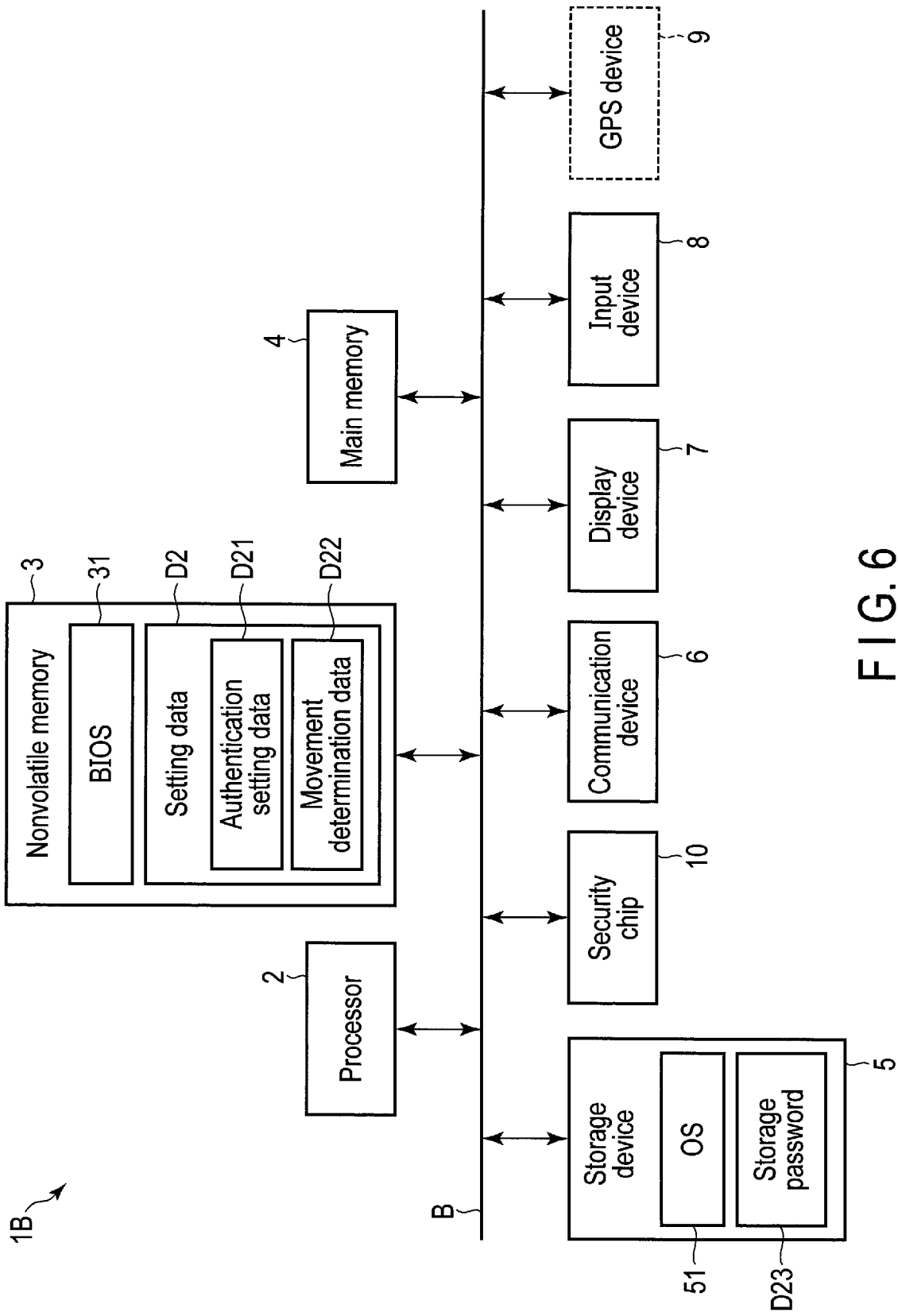
FIG. 6 is a block diagram showing an example of an electronic device according to a second embodiment.

FIG. 6 is a block diagram showing an example of an electronic device 1B of the present embodiment.

In the present embodiment, a nonvolatile memory 3 stores setting data D2. Likewise the setting data D1, the setting data D2 is data for storing set values which are selected or input by a user for various setting items of a BIOS 31, and includes authentication setting data D21, movement determination data D22, and the like. The authentication setting data D21 and the movement determination data D22 in the storage password authentication play a role similarly to the authentication setting data D12 and the movement determination data D13 of the electronic device 1A in the startup password authentication.

A storage device 5 includes a storage password D23, in addition to an OS 51. The storage password D23 is a password set for access to the storage device 5. For example, when the user starts the OS 51 of the storage device 5 for which authentication by the storage password D23 is validated, the storage password must be input.

While the storage password D23 may be stored into the nonvolatile memory 3, preferably, the storage password D23 should be stored into the storage device 5 so that the storage password authentication can be executed also when the storage device 5 is incorporated in another electronic device. Further, the storage password D23 is encrypted in order to prevent it from being easily read. Encryption of the storage password D23 is executed by a security chip 10 which will be described later.

Note that also for the storage password authentication according to the present embodiment, likewise the startup password authentication of the first embodiment, the setting can be made on a setting screen of the BIOS 31, and a mode can be selected from three types of setting, which are "always validated", "always invalidated", and "validated when moved".

Also, the electronic device 1B includes the security chip 10, for example. The security chip 10 is a device for encrypting or decrypting data stored in the storage device 5. The security chip 10 may be stored in the storage device 5.

The security chip 10 decrypts data when it is read from the storage device 5, and encrypts data when it is written to the storage device 5.

Since the other structures of the electronic device 1B is similar to those of the electronic device 1A, explanation thereof is omitted.

FIG. 7 is a flowchart showing a first example of processing performed until the OS of the electronic device 1B is started according to the present embodiment.

In step S501, the electronic device 1B is powered on. Note that the electronic device 1B may be cold booted, or may be restored from a pause mode (hibernation) or a sleep mode. Steps S502 to S508 described below represent a storage password authentication process.

In step S502, the BIOS 31 reads the authentication setting data D21 from the nonvolatile memory 3, and confirms the storage password authentication setting. If the startup password authentication is set to "always validated", in step S503, the security chip 10 decrypts the storage password D23 based on a command of the BIOS 31. Further, in step S504, the BIOS 31 prompts the user to input a storage password.

Since the processing when the storage password authentication is set to "validated when moved" or "always invalidated" (steps S504 and S505) is similar to the processing of step S305 of FIG. 5, explanation thereof is omitted. Note that when it is determined that password authentication is required in step S505, similarly to the case where the storage password authentication is set to "always validated", steps S503 and S504 are executed.

In step S506, the BIOS 31 performs the password authentication using the storage password. More specifically, the BIOS 31 compares the storage password D23 obtained in step S503 with the storage password input by the user in step S504. If a result of the comparison indicates a match (two storage passwords match), password authentication succeeds, so that the processing proceeds to step S509, and the storage can be accessed (in other words, the OS is started).

Meanwhile, if the comparison result indicates a mismatch (two storage passwords do not match), the authentication fails. In this case, the BIOS 31 performs error handling, etc., in step S507. Further, the security chip 10 encrypts the storage password D23 of the storage device 5 on the basis of the command of the BIOS 31 in step S508.

Figure 8:
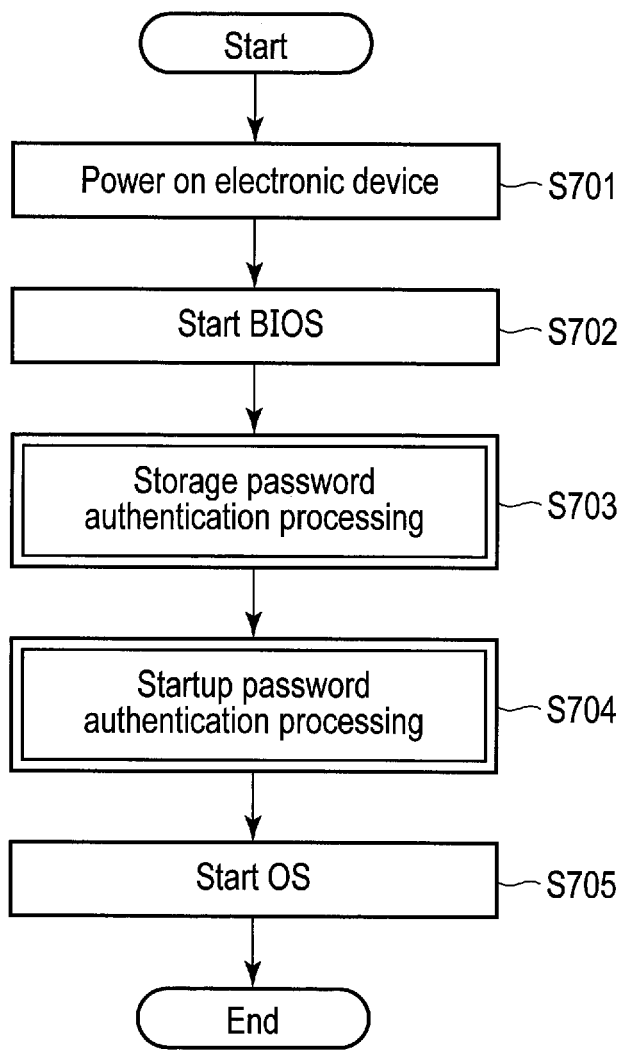
FIG. 8 is a flowchart showing a second example of the processing performed until the OS of the electronic device is started according to the second embodiment.

FIG. 8 is a flowchart showing a second example of processing performed until the OS of the electronic device 1B is started according to the present embodiment. The example of FIG. 8 shows the processing performed until the OS of the electronic device 1B is started, in a case of combining both the startup password authentication explained in the first embodiment and the storage password authentication of the present embodiment.

Note that for the authentication setting data D21 and/or the movement determination data D22, different values may be set for the startup password authentication and the storage password authentication separately, or a common value may be set for the two password authentications.

In step S701, the electronic device 1B is powered on likewise step S501.

In step S702, the BIOS 31 is started likewise step S302.

In step S703, storage password authentication processing is executed. The storage password authentication processing corresponds to processing of steps S502 to S508 of FIG. 7.

In step S704, startup password authentication processing is executed. The startup password authentication processing corresponds to processing of steps S303 to S307 of FIG. 5.

In step S705, when the storage password authentication of step S703 and the startup password authentication of step S704 are both completed without fail, the BIOS 31 starts the OS 51.

Note that when the storage password authentication succeeds in step S703, the BIOS 31 may skip the startup password authentication.

Also, the authentication processes of steps S703 and S704 may be interchanged. In other words, the storage password authentication process may be executed after execution of the startup password authentication process.

According to the present embodiment described above, in addition to the "always validated" and "always invalidated" modes of the password authentication by the storage device 5, a "validated when moved" mode, which is the setting item indicating that the above two modes are to be automatically switched, is added to the BIOS 31, which operates on the electronic device 1B. By this feature, even if the user forgot to validate the storage password authentication when the electronic device 1B is moved to a place other than the particular environment, for example, because the password authentication is set to be validated automatically, the security of the storage device 5 is enhanced.

In the present embodiment, automatic switching setting can be employed in both the storage password authentication and the startup password authentication in combination. By this feature, as compared to a case where either one of these two types of authentication is employed, there is an advantage in that the security of the electronic device 1B is further enhanced because double passwords are set when the user uses the electronic device 1B at a place other than the particular environment, for example, and the convenience of the user is further enhanced because the password authentication is not required when the electronic device 1B is used in the particular environment.

Further, when automatic switching setting is applied to both the storage password authentication and the startup password authentication, the BIOS 31 may automatically switch the password authentication as to which password authentication should be performed in accordance with the environment where the electronic device 1B is used. For example, when the electronic device 1B is connected to a first specific network, both the startup password authentication and the storage password authentication may be employed, whereas, when the electronic device 1B is connected to a second specific network, only the storage password authentication may be employed, and when the electronic device 1B is connected to the other network, only the startup password authentication may be employed. As a result, since uniform application of password authentication can be avoided, the security of the electronic device 1B can be enhanced. Note that switching processing for the above storage password authentication and the startup password authentication is also applicable to a case where the position information is acquired by the GPS device 9, instead of a case where the electronic device 1B is connected to a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device that executes an operating system, the electronic device comprising:
    a first storage that stores the operating system;
    a firmware that controls a hardware included in the electronic device after the electronic device is powered on and before the operating system is executed;
    a display that displays a user interface of the firmware; and
    an input device that accepts a user's operation, wherein
    the firmware displays, on the display a setting screen including a first setting item and second setting item, the first setting item being selectable among a first item that is for invalidating a password authentication, a second item that is for validating the password authentication, and a third item that is different from the first item and the second item, the second setting item including a network address, that automatically be acquired and inputted, of a network currently connected to the electronic device or a current location of the electronic device that automatically be acquired and inputted, and wherein
    the firmware determines that the firmware receives a start instruction for starting an operation for validating or invalidating the password verification when a button for entering the setting screen is operated after the third item is selected as the first setting item, and determines whether or not the electronic device is in a particular environment based on a network address of a network connected to the electronic device after the firmware receives the starting instruction and the network address inputted as the second setting item or a location of the electronic device after the firmware receives the start instruction and the current location inputted as the second setting item,
    the firmware invalidates a password authentication when the firmware determines that the electronic device is in the particular environment wherein the operating system is executed after the password authentication is invalidated, and
    the firmware validates the password authentication when the firmware determines that the electronic device is out of the particular environment wherein the operating system is executed when the password authentication succeeds and the operating system is not executed when the password authentication fails.

2. The electronic device of claim 1, wherein the password authentication is a startup password authentication of the firmware.

3. The electronic device of claim 1, wherein the password authentication is a password authentication to be executed when the first storage is accessed.

4. The electronic device of claim 1, wherein the firmware is one of a BIOS (Basic Input/Output System), an EFI (Extensible Firmware Interface)-BIOS, or a UEFI (Unified Extensible Firmware Interface)-BIOS.

5. A method for controlling a hardware included in an electronic device after the electronic device is powered on and before an operating system is executed by the hardware, the method comprising:
    displaying, on a display of the electronic device, a setting screen including a first setting item and second setting item, the first setting item being selectable among a first item indicating that a password authentication is to be invalidated, a second item indicating that the password authentication is to be validated and a third item that is different from the first item and the second item, the second setting item including a network address, that automatically be acquired and inputted, of a network currently connected to the electronic device or a current location of the electronic device that automatically be acquired and inputted,
    receiving a start instruction for starting an operation for validating or invalidating the password verification when a button for entering the setting screen is operated after the third item is selected as the first setting item,
    determining whether or not the electronic device is in a particular environment based on a network address of a network connected to the electronic device after receiving a start instruction, and the network address inputted as the second setting item or a location of the electronic device after receiving the start instruction and the current location inputted as the second setting item,
    invalidating a password authentication when determining that the electronic device is in the particular environment wherein the operating system is executed after the password authentication is invalidated; and
    validating the password authentication when determining that the electronic device is out of the particular environment wherein the operating system is executed when the password authentication succeeds and the operating system is not executed when the password authentication fails.

6. A nonvolatile memory that stores a program executed by a computer for controlling a hardware included in an electronic device after the electronic device is powered on and before an operating system is executed by the hardware, the program causing the computer to function as:
    displaying, on a display of the electronic device, a setting screen including a first setting item and second setting item, the first setting item being selectable among a first item indicating that a password authentication is to be invalidated, a second item indicating that the password authentication is to be validated and a third item that is different from the first item and the second item, the second setting item including a network address, that automatically be acquired and inputted, of a network currently connected to the electronic device or a current location of the electronic device that automatically be acquired and inputted, receiving a start instruction for starting an operation for validating or invalidating the password verification when a button for entering the setting screen is operated after the third item is selected as the first setting item, determining whether or not the electronic device is in a particular environment based on a network address of a network connected to the electronic device after receiving the start instruction and the network address inputted as the second setting item or a location of the electronic device after receiving the start instruction and the current location inputted as the second setting item, invalidating a password authentication when determining that the electronic device is in the particular environment wherein the operating system is executed after the password authentication is invalidated; and validating the password authentication when determining that the electronic device is out of the particular environment wherein the operating system is executed when the password authentication succeeds and the operating system is not executed when the password authentication fails.

7. The nonvolatile memory of claim 6, wherein the program further causes the computer to function as:

storing, when a selection operation for the first setting item is accepted via an input device of the electronic device, first setting data corresponding to the selection operation into a storage of the electronic device.

* * * * *